United States Patent
Saitwal et al.

(10) Patent No.: US 11,017,236 B1
(45) Date of Patent: *May 25, 2021

(54) ANOMALOUS OBJECT INTERACTION DETECTION AND REPORTING

(71) Applicant: Intellective Ai, Inc., Dallas, TX (US)

(72) Inventors: Kishor Adinath Saitwal, Pearland, TX (US); Dennis G. Urech, Katy, TX (US); Wesley Kenneth Cobb, The Woodlands, TX (US)

(73) Assignee: Intellective Ai, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/522,926

(22) Filed: Jul. 26, 2019

Related U.S. Application Data

(63) Continuation of application No. 15/874,172, filed on Jan. 18, 2018, now Pat. No. 10,410,058, which is a continuation of application No. 13/931,058, filed on Jun. 28, 2013, now Pat. No. 9,911,043.

(60) Provisional application No. 61/666,458, filed on Jun. 29, 2012.

(51) Int. Cl.
  *G06T 13/00* (2011.01)
  *G06K 9/00* (2006.01)
  *G06K 9/62* (2006.01)

(52) U.S. Cl.
  CPC ........ *G06K 9/00711* (2013.01); *G06K 9/6221* (2013.01); *G06K 9/6284* (2013.01)

(58) Field of Classification Search
  CPC . G06K 9/00711; G06K 9/6221; G06K 9/6284
  USPC ........................................................ 345/474
  See application file for complete search history.

(56) References Cited

U.S. PATENT DOCUMENTS

| | | |
|---|---|---|
| 4,679,077 A | 7/1987 | Yuasa et al. |
| 5,113,507 A | 5/1992 | Jaeckel |
| 5,748,775 A | 5/1998 | Tsuchikawa et al. |
| 5,751,378 A | 5/1998 | Chen et al. |

(Continued)

FOREIGN PATENT DOCUMENTS

WO  WO 2009/049314  4/2009

OTHER PUBLICATIONS

Nguyen, T. T. et al., "Graph-based Mining of Multiple Object Usage Patterns," ESEC/FSE '09: Proceedings of the 17th ACM SIGSOFT Symposium on the Foundations of Software Engineering. ACM Press, 2009.

(Continued)

*Primary Examiner* — Jin Ge

(57) ABSTRACT

Techniques are disclosed for analyzing a scene depicted in an input stream of video frames captured by a video camera. The techniques include evaluating sequence pairs representing segments of object trajectories. Assuming the objects interact, each of the sequences of the sequence pair may be mapped to a sequence cluster of an adaptive resonance theory (ART) network. A rareness value for the pair of sequence clusters may be determined based on learned joint probabilities of sequence cluster pairs. A statistical anomaly model, which may be specific to an interaction type or general to a plurality of interaction types, is used to determine an anomaly temperature, and alerts are issued based at least on the anomaly temperature. In addition, the ART network and the statistical anomaly model are updated based on the current interaction.

20 Claims, 4 Drawing Sheets

(56) References Cited

U.S. PATENT DOCUMENTS

| | | | |
|---|---|---|---|
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,825,954 B2 | 11/2010 | Zhang et al. | |
| 7,868,912 B2 | 1/2011 | Venetianer et al. | |
| 8,391,548 B1 * | 3/2013 | Medioni | G06K 9/00771 382/103 |
| 9,911,043 B2 * | 3/2018 | Saitwal | G06K 9/00711 |
| 10,410,058 B1 * | 9/2019 | Saitwal | G06K 9/6221 |
| 2003/0107650 A1 | 6/2003 | Colmenarez et al. | |
| 2003/0228058 A1 | 12/2003 | Xie et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0138338 A1 | 6/2006 | Tezuka et al. | |
| 2006/0165386 A1 | 7/2006 | Garoutte | |
| 2006/0190419 A1 | 8/2006 | Bunn et al. | |
| 2006/0193493 A1 | 8/2006 | Toyama et al. | |
| 2006/0222206 A1 | 10/2006 | Garoutte | |
| 2007/0250898 A1 | 10/2007 | Scanlon et al. | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0208828 A1 | 8/2008 | Boiman | |
| 2008/0240496 A1 | 10/2008 | Senior | |
| 2008/0247599 A1 | 10/2008 | Porikli et al. | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0153661 A1 | 6/2009 | Cheng | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |
| 2010/0150471 A1 | 6/2010 | Cobb et al. | |
| 2010/0208063 A1 | 8/2010 | Lee | |
| 2010/0322516 A1 | 12/2010 | Xu et al. | |
| 2011/0043536 A1 * | 2/2011 | Cobb | G06K 9/00771 345/629 |
| 2011/0043626 A1 * | 2/2011 | Cobb | G06K 9/00771 348/143 |
| 2011/0044492 A1 * | 2/2011 | Cobb | G06K 9/00771 382/100 |
| 2011/0044498 A1 | 2/2011 | Cobb | |
| 2011/0044499 A1 * | 2/2011 | Cobb | G06K 9/00771 382/103 |
| 2011/0051992 A1 | 3/2011 | Cobb | |
| 2011/0052068 A1 | 3/2011 | Cobb | |
| 2012/0224746 A1 | 9/2012 | Cobb | |
| 2012/0238234 A1 | 9/2012 | Duarte | |

OTHER PUBLICATIONS

Connell, J. et al., "Detection and Tracking in the IBM PeopleVision System," IEEE ICME, Jun. 2004, pp. 1-4.

Grabner, H. et al., "On-line Boosting and Vision," IEEE Conference on Computer Vision and Pattern Recognition (CVPR), 2006, vol. 1, pp. 260-267.

Haritaoglu, I. et al., "Ghost: A Human Body Part Labeling System Using Silhouettes," 14th Annual International Conference on Pattern Recognition, Aug. 1998, pp. 77-82.

Nock, R. et al., "Statistical Region Merging, IEEE Transactions on Pattern Analysis and Machine Intelligence," Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Subtraction," Computer Vision Laboratory, University of Maryland; Jun. 2000; 17 pages, College Park, MD US.

Haritaoglu, I. et al., "W4: Real-time surveillance of people and their activities," IEEE Transactions on Pattern Analysis and Machine Intelligence, 22(8):809-830 (Aug. 2000).

Ivanov et al. "Video Surveillance of Interactions," MIT Media Laboratory, Cambridge, MA, Jul. 1999, 8 pages, Fort Collins, CO.

Stauffer, C. et al., "Adaptive background mixture models for real-time tracking," Proceedings IEEE Conference on Computer Vision and Pattern Recognition, 1999, pp. 246-252.

Kanerva, P., "Sparse Distributed memory and Related Models," M.H. Hassoun, ed., Associative Neural Memories: Theory and Implementation, 1993, pp. 50-76, New York: Oxford University Press.

Senior et al. "Appearance Models for Occlusion Handling," IBM T.J. Watson Research Center, 2001, 8 pages, Yorktown, Heights, NY US.

Stauffer, C. et al., "Learning Patterns of Activity Using Real-Time Tracking," IEEE Transactions on Pattern Analysis and Machine Intelligence (TPAMI), Aug. 2000, 22(8): 747-757.

* cited by examiner

ANOMALOUS OBJECT INTERACTION DETECTION AND REPORTING

CROSS-REFERENCE TO RELATED APPLICATIONS

This application is a continuation of U.S. patent application Ser. No. 15/874,172, filed on Jan. 18, 2018, which is a continuation of U.S. patent application Ser. No. 13/931,058, filed on Jun. 28, 2013, now U.S. Pat. No. 9,911,043, registered on Mar. 6, 2018, which claims priority to U.S. provisional application having Ser. No. 61/666,458, filed on Jun. 29, 2012, the entireties of each of which are hereby incorporated by reference in their entireties.

BACKGROUND OF THE INVENTION

Field of the Invention

Embodiments of the invention provide techniques for analyzing a sequence of video frames. More particularly, to analyzing and learning behavior based on streaming video data, including detection and reporting of anomalous object interactions.

Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of pre-defined events, e.g., the system may evaluate the appearance of an object classified as depicting a car (a vehicle-appear event) coming to a stop over a number of frames (a vehicle-stop event). Thereafter, a new foreground object may appear and be classified as a person (a person-appear event) and the person then walks out of frame (a person-disappear event). Further, the system may be able to recognize the combination of the first two events as a "parking-event."

However, such surveillance systems typically are unable to identify or update objects, events, behaviors, or patterns (or classify such objects, events, behaviors, etc., as being normal or anomalous) by observing what happens in the scene over time; instead, such systems rely on static patterns defined in advance. For example, such surveillance systems are unable to automatically distinguish anomalous object interactions (e.g., an unusual tailgating event) in a scene from ordinary object interactions (e.g., tailgating which occurs normally) in the scene and report instances of anomalous object interactions to a user.

SUMMARY OF THE INVENTION

One embodiment of the invention provides a method for analyzing a scene captured by a video camera or other recorded video. The method may generally include receiving two or more sequences, each sequence corresponding to a segment of a trajectory taken by a respective object through the scene. In addition, the method may include determining whether the objects interact based on a spatiotemporal proximity of the objects. If the objects interact, the method may further include mapping each sequence of the two or more sequences to a sequence cluster, and determining a rareness value for the sequence clusters to which the sequences map based on a learned joint probability of the sequence clusters.

Other embodiments include a computer-readable medium that includes instructions that enable a processing unit to implement one or more embodiments of the disclosed method as well as a system configured to implement one or more embodiments of the disclosed method.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
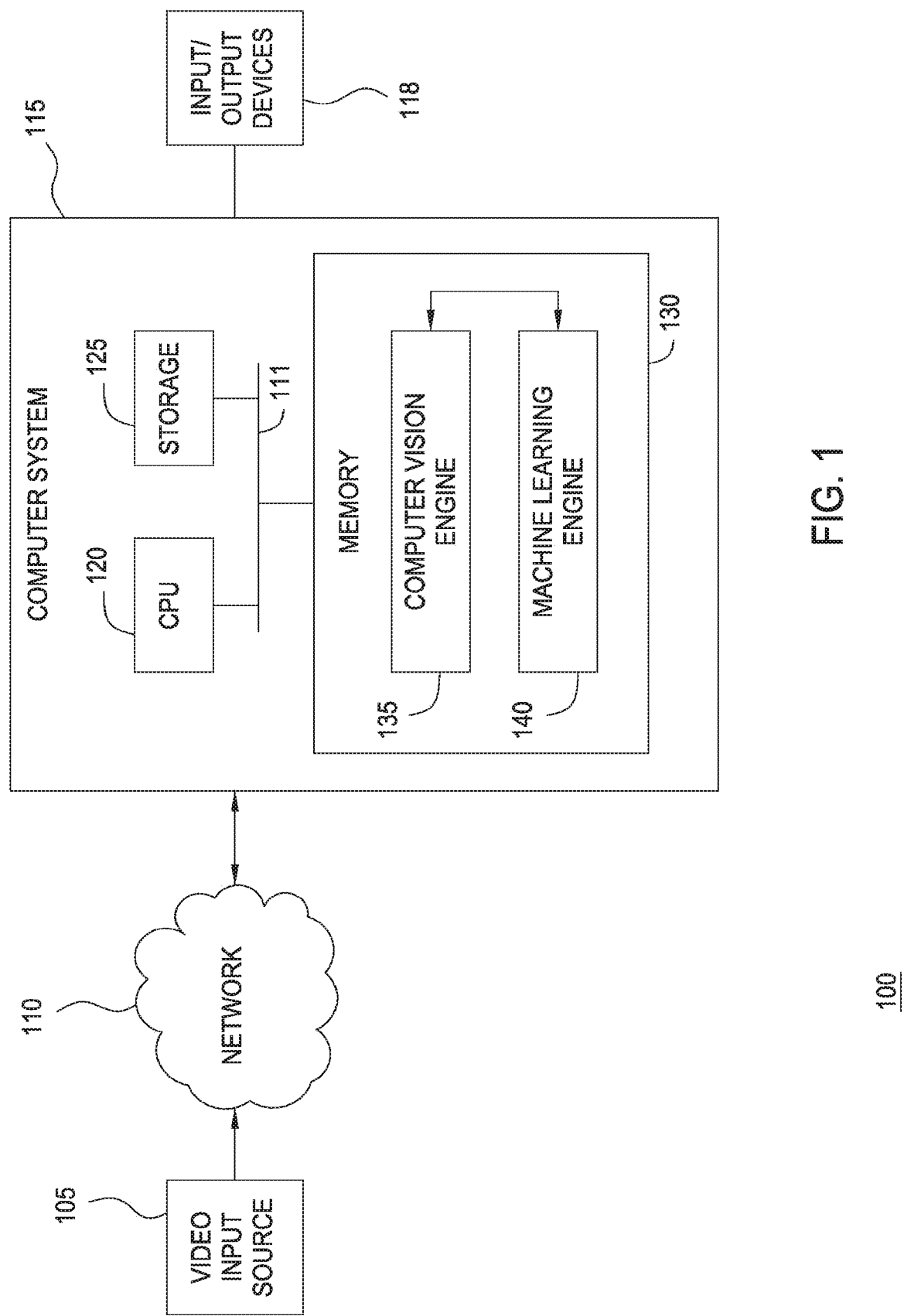
FIG. 1 illustrates components of a video analysis system, according to one embodiment of the invention.

Embodiments of the present invention provide a method and a system for analyzing and learning behavior based on an acquired stream of video frames. A machine-learning video analytics system may be configured to use a computer vision engine to observe a scene, generate information streams of observed activity, and to pass the streams to a machine learning engine. In turn, the machine learning engine may be engaged in an undirected and unsupervised learning approach to learn patterns regarding the object behaviors in that scene. Thereafter, when unexpected (i.e., abnormal or unusual) behavior is observed, alerts may be generated.

In addition to the learning-based behavior, the machine learning engine may be configured to build models of certain behaviors within the scene and determine whether observations indicate that the behavior of an object is anomalous or not, relative to the model. In one embodiment, e.g., the machine learning engine may include a module for detecting an object interaction, determining a type of the interaction, and determining whether the interaction is unusual or anomalous relative to prior object interactions (e.g., interactions of the same type). That is, such a module may be used to determine an interaction type for an object interaction and whether the object interaction is abnormal in the scene.

To make such a determination, the detection module may be configured to evaluate sequence pairs representing segments of trajectories taken by objects. In particular, the detection module may determine whether the objects interact based on spatio-temporal proximity of the objects. Assuming the objects interact, the detection module may further determine, for each of the sequences of the sequence pair, a sequence cluster of an adaptive resonance theory (ART) network to which the sequence maps. The detection module may then determine a rareness value for a sequence cluster pair based on learned joint probabilities of sequence cluster pairs. The detection module may further use a statistical anomaly model, which may be specific to an interaction type or general to a plurality of interaction types, to determine an anomaly temperature, and alerts may be issued based at least on the anomaly temperature. In addition, the detection module may update the ART network and the statistical anomaly model based on the interaction.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 which includes both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known formats including MPEG2, MJPEG, MPEG4, H.263, H.264, and the like.

As noted above, the computer vision engine 135 may be configured to analyze this raw information to identify active objects in the video stream, identify a variety of appearance and kinematic features used by a machine learning engine 140 to derive object classifications, derive a variety of metadata regarding the actions and interactions of such objects, and supply this information to the machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, cluster objects having similar visual and/or kinematic features, build semantic representations of events depicted in the video frames. Over time, the machine learning engine 140 learns expected patterns of behavior for objects that map to a given cluster. Thus, over time, the machine learning engine learns from these observed patterns to identify normal and/or abnormal events. That is, rather than having patterns, objects, object types, or activities defined in advance, the machine learning engine 140 builds its own model of what different object types have been observed (e.g., based on clusters of kinematic and or appearance features) as well as a model of expected behavior for a given object type. In particular, the machine learning engine may model the kinematic properties of one or more types of objects (e.g., how two objects interact). Thereafter, the machine learning engine can decide whether an observed object interaction event is anomalous based on a learning model and a statistical anomaly model, discussed in greater detail below.

Data describing whether an anomalous object interaction has been determined and/or describing the anomalous object interaction may be provided to output devices 118 to issue alerts (e.g., an alert message presented on a GUI interface screen).

In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 may analyze each frame in real-time to derive a set of appearance and kinematic data related to objects observed in the frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results over network 110.

Figure 2:
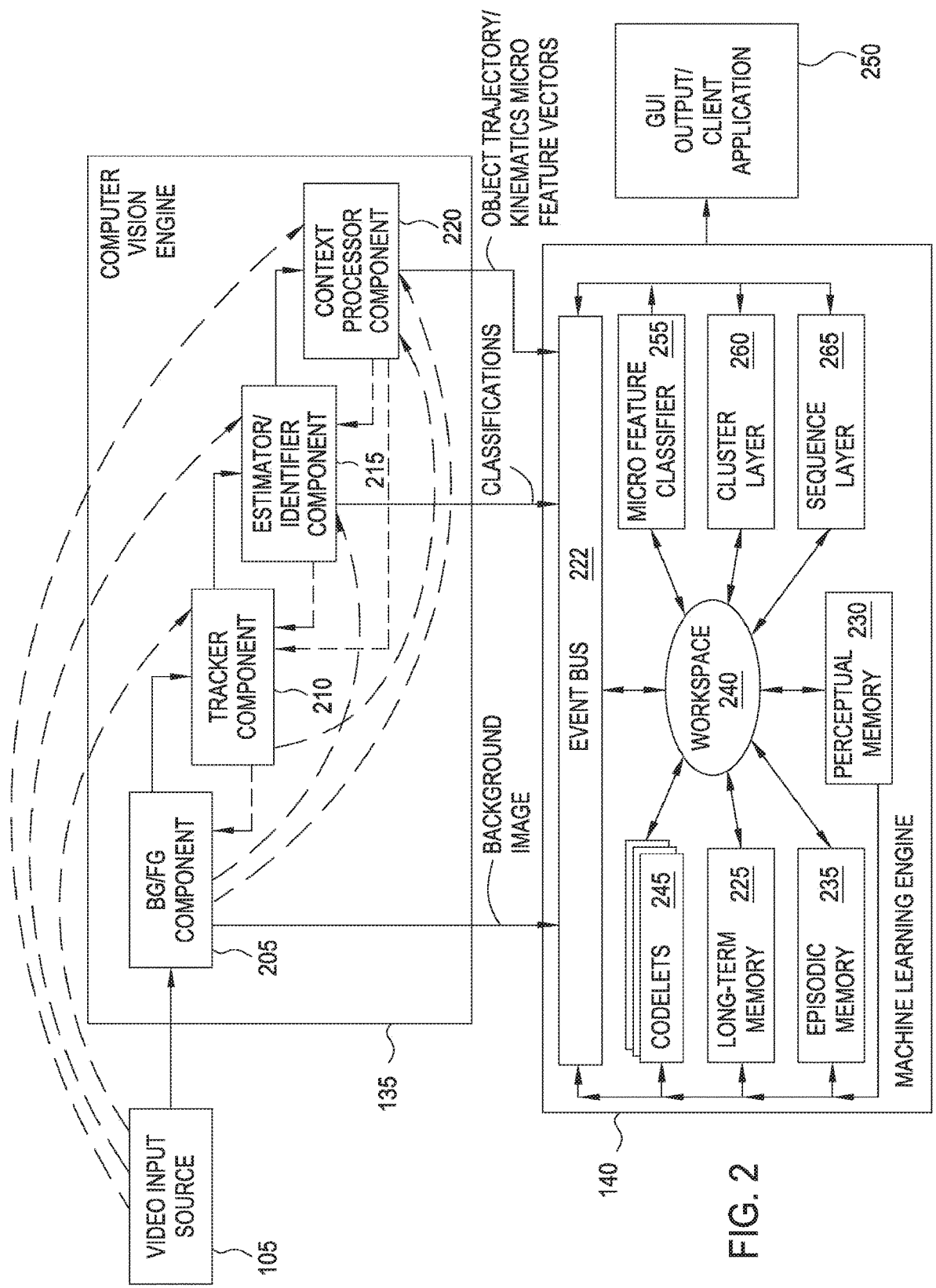
FIG. 2 further illustrates components of the video analysis system shown in FIG. 1, according to one embodiment of the invention.

FIG. 2 further illustrates components of the computer vision engine 135 and the machine-learning engine 140 first illustrated in FIG. 1, according to one embodiment of the invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case and further that additional components may be added (or some may be removed).

In one embodiment, the BG/FG component 205 may be configured to separate each frame of video provided by the video input source 105 into a static part (the scene background) and a collection of volatile parts (the scene foreground.) The frame itself may include a two-dimensional array of pixel values for multiple channels (e.g., RGB channels for color video or grayscale channel or radiance channel for black and white video). In one embodiment, the BG/FG component 205 may model background states for each pixel using an adaptive resonance theory (ART) network. That is, each pixel may be classified as depicting scene foreground or scene background using an ART network modeling a given pixel. Of course, other approaches to distinguish between scene foreground and background may be used.

Additionally, the BG/FG component 205 may be configured to generate a mask used to identify which pixels of the scene are classified as depicting foreground and, conversely, which pixels are classified as depicting scene background. The BG/FG component 205 then identifies regions of the scene that contain a portion of scene foreground (referred to as a foreground "blob" or "patch") and supplies this information to subsequent stages of the pipeline. Additionally, pixels classified as depicting scene background maybe used to generate a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of an object depicted by a given foreground patch as it moves about the scene. That is, the tracker component 210 provides continuity to other elements of the system by tracking a given object from frame-to-frame.

The estimator/identifier component 215 may receive the output of the tracker component 210 (and the BF/FG component 205) and identify a variety of kinematic and/or appearance features of a foreground object, e.g., size, height, width, and area (in pixels), reflectivity, shininess rigidity, speed velocity, etc.

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and evaluated (by estimator identifier component 215). For example, the context processor component 220 may package a stream of micro-feature vectors and kinematic observations of an object and output this to the machine-learning engine 140, e.g., at a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of dissolving into the frame background). Accordingly, assuming computer vision engine 135 is operating at a rate of 5 Hz, a trajectory for an object is updated every 200 milliseconds, until complete.

The computer vision engine 135 may take the output from the components 205, 210, 215, and 220 describing the motions and actions of the tracked objects in the scene and supply this information to the machine-learning engine 140. Illustratively, the machine-learning engine 140 includes a long-term memory 225, a perceptual memory 230, an episodic memory 235, a workspace 240, codelets 245, a micro-feature classifier 255, a cluster layer 260 and a sequence layer 265. Additionally, the machine-learning engine 140 includes a client application 250, allowing the user to interact with the video surveillance system 100 using a graphical user interface. Further still, the machine-learning engine 140 includes an event bus 222. In one embodiment, the components of the computer vision engine 135 and machine-learning engine 140 output data to the event bus 222. At the same time, the components of the machine-learning engine 140 may also subscribe to receive different event streams from the event bus 222. For example, the micro-feature classifier 255 may subscribe to receive the micro-feature vectors output from the computer vision engine 135.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select which codelets 245 to execute. Each codelet 245 may be a software program configured to evaluate different sequences of events and to determine how one sequence may follow (or otherwise relate to) another (e.g., a finite state machine). More generally, each codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream). The episodic memory 235 stores data representing observed events with details related to a particular episode, e.g., information describing time and space details related to an event. That is, the episodic memory 235 may encode specific details of a particular event, i.e., "what and where" something occurred within a scene, such as a particular vehicle (car A) moved to a location believed to be a parking space (parking space 5) at 9:43 AM.

In contrast, the long-term memory 225 may store data generalizing events observed in the scene. To continue with the example of a vehicle parking, the long-term memory 225 may encode information capturing observations and generalizations learned by an analysis of the behavior of objects in the scene such as "vehicles in certain areas of the scene tend to be in motion," "vehicles tend to stop in certain areas of the scene," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

The micro-feature classifier 255 may schedule a codelet 245 to evaluate the micro-feature vectors output by the computer vision engine 135. As noted, the computer vision engine 135 may track objects frame-to-frame and generate micro-feature vectors for each foreground object at a rate of, e.g., 5 Hz. In one embodiment, the micro-feature classifier 255 may be configured to create clusters from this stream of micro-feature vectors. For example, each micro-feature vector may be supplied to an input layer of the ART network (or a combination of a self organizing map (SOM) and ART network used to cluster nodes in the SOM). In response, the ART network maps the micro-feature vector to a cluster in the ART network and updates that cluster (or creates a new cluster if the input micro-feature vector is sufficiently dissimilar to the existing clusters). Each cluster is presumed to represent a distinct object type, and objects sharing similar micro-feature vectors (as determined using the choice and vigilance parameters of the ART network) may map to the same cluster.

For example, the micro-features associated with observations of many different vehicles may be similar enough to map to the same cluster (or group of clusters). At the same time, observations of many different people may map to a different cluster (or group of clusters) than the vehicles cluster. Thus, each distinct cluster in the art network generally represents a distinct type of object acting within the scene. And as new objects enter the scene, new object types may emerge in the ART network.

Importantly, however, this approach does not require the different object type classifications to be defined in advance; instead, object types emerge over time as distinct clusters in the ART network. In one embodiment, the micro-feature classifier 255 may assign an object type identifier to each cluster, providing a different object type for each cluster in the ART network.

In an alternative embodiment, rather than generate clusters from the micro-features vector directly, the micro-feature classifier 255 may supply the micro-feature vectors to a self-organizing map structure (SOM). In such a case, the ART network may cluster nodes of the SOM—and assign an object type identifier to each cluster. In such a case, each SOM node mapping to the same cluster is presumed to represent an instance of a common type of object.

As shown, the machine-learning engine 140 also includes a cluster layer 260 and a sequence layer 265. As described in greater detail below, the cluster layer 260 may be configured to generate clusters from the trajectories of objects classified by the micro-feature classifier 255 as being an instance of a common object type. In one embodiment, the cluster layer 260 uses a combination of a self-organizing map (SOM) and an ART network to cluster the kinematic data in the trajectories. Once the trajectories are clustered, the sequence layer 265 may be configured to generate sequences encoding the observed patterns of behavior represented by the trajectories. And once generated, the sequence layer may identify segments within a sequence using a voting experts technique. Further, the sequence layer 265 may be configured to identify anomalous segments and sequences.

In addition to the learning process discussed above, embodiments may be configured to learn object interaction behaviors and generate alerts when an anomalous object interaction is identified, as discussed in greater detail below.

Detecting Anomalous Object Interactions in a Machine-Learning Video Analytics System As noted above, a machine-learning video analytics system may be configured to use a computer vision engine to observe a scene, generate information streams of observed activity, and to pass the streams to a machine learning engine. In turn, the machine learning engine may be engaged in an undirected and unsupervised learning approach to learn patterns regarding the object behaviors in that scene. Thereafter, when unexpected (i.e., abnormal or unusual) behavior is observed, alerts may be generated.

In addition to the learning-based behavior, the machine learning engine may be configured to build models of certain behaviors within the scene and determine whether observations indicate that the behavior of an object is anomalous or not, relative to the model. In one embodiment, e.g., the machine learning engine may include a module for detecting an object interaction, determining a type of the interaction, and determining whether the interaction is unusual or anomalous relative to prior object interactions (e.g., interactions of the same type). That is, such a module may be used to determine an interaction type for an object interaction and whether the object interaction is abnormal in the scene.

To make such a determination, the detection module may be configured to evaluate sequence pairs representing segments of trajectories taken by objects. In particular, the detection module may determine whether the objects interact based on spatio-temporal proximity of the objects. Assuming the objects interact, the detection module may further determine, for each of the sequences of the sequence pair, a sequence cluster of an adaptive resonance theory (ART) network to which the sequence maps. The detection module may then determine a rareness value for a sequence cluster pair based on learned joint probabilities of sequence cluster pairs. The detection module may further use a statistical anomaly model, which may be specific to an interaction type or general to a plurality of interaction types, to determine an anomaly temperature, and alerts may be issued based at least on the anomaly temperature. In addition, the detection module may update the ART network and the statistical anomaly model based on the interaction.

Figure 3:
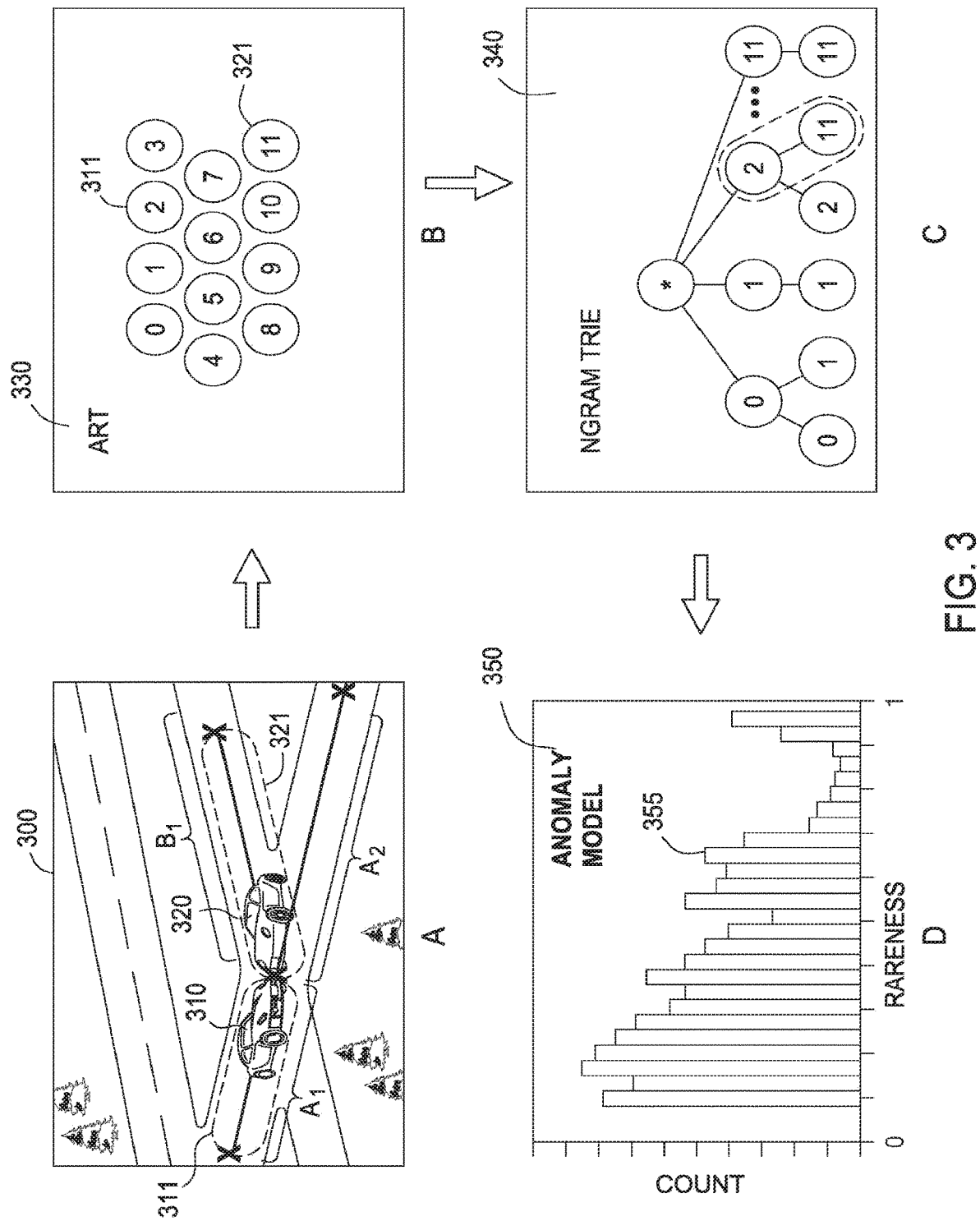
FIG. 3 illustrates an exemplary interaction of objects and an approach for determining whether the interaction is anomalous, according to one embodiment.

FIG. 3 illustrates an exemplary interaction of objects and an approach for determining whether the interaction is anomalous, according to one embodiment. Panel A depicts an example video frame sequence 300. As shown, the vehicle 310 in the video frame sequence 300 travels across a road in the scene along a trajectory which includes sequences A1 and A2. Similarly, vehicle 320 travels across a second road along a trajectory which includes sequence B1. As used herein, "trajectory" refers to a path across a scene which an object takes, and "sequence" refers to a portion of a trajectory. In one embodiment, a voting experts component may be configured to segment a given trajectory into sequences which maximize entropy between segments and minimize internal entropy within each segment, as described in Patent Publication No. US 2011/0044492 A1, hereby incorporated by reference in its entirety.

As further shown in Panel A, the sequences A1 and B1 map to sequence clusters 311 and 321, respectively, of an adaptive resonance theory (ART) network. Panel B depicts the ART network's 330 clustering of sequences for the scene. In general, the ART network 330 may be configured to learn whether one or more sequences are of a common sequence type. The ART network 330 may thus categorize observed sequences into sequence clusters, with each sequence cluster representing a distinct sequence type. For example, vehicles traveling along the road taken by vehicle 310 may generally traverse the scene via slightly different trajectories (e.g., by changing lanes, etc.). As a result, sequences induced from those trajectories will differ from A1 and A2, even if the vehicles travel along roughly the same path as vehicle 310. In such a case, the ART network 330 may use, for example, sequence cluster 311 to represent a sequence type which includes sequence A1 and similar sequences.

Panel C depicts an ngram trie 340 which represents previously observed sequence cluster pairs and stores joint probabilities for those sequence cluster pairs. As shown in Panel A, vehicle 310 and vehicle 320 are in close spatio-temporal proximity. That is, vehicle 310 appears in the scene at a close location and time to vehicle 320. The detection module may be configured to determine that an interaction has occurred between two objects based on their spatio-temporal proximity. Illustratively, the detection module may determine that vehicle 310 and vehicle 320 have interacted because of their close spatio-temporal proximity (e.g., that they are within 5 pixels and 5 seconds of each other). As a result, the detection module may designate the sequence clusters 311 and 321, which are mapped from the sequences of the vehicles 310, 320, as a sequence cluster pair for further analysis.

As shown in panel C, each observed sequence cluster pair (e.g., 2:11) is represented in the ngram trie 340 by a node in one trie layer and a second node in another trie layer. In one embodiment, the ngram trie 340 may include two layers, the nodes of which correspond to the sequence clusters of observed sequence cluster pairs. The ngram trie 340 may be incrementally updated to include additional node pairs representing new sequence cluster pairs when those cluster pairs are observed in the scene. Further, the ngram trie 340 may store (e.g., in its leaf nodes) joint probabilities for particular sequence cluster pairs, with each joint probability indicating a likelihood that a corresponding sequence cluster pair occurs within the scene. In one embodiment, the joint probability may be stored as a count of the total number of times (also referred to herein as the "frequency") that the sequence cluster pair has been observed. Illustratively, the detector module may traverse the ngram trie 340 to retrieve the joint probability (e.g., the frequency count) for the sequence cluster pair 2:11 which was observed in the video frame sequence 300. Further, the detector module may iteratively update the joint probability for the sequence cluster pair 2:11 stored in the ngram trie 340 based on newly observed events.

After retrieving the joint probability for sequence cluster pair 2:11 from the ngram trie 340, the detector module may determine a rareness value using the joint probability. As discussed in greater detail below, the rareness value may indicate how rare a given event is in the scene, as compared to other events.

Panel D depicts a statistical anomaly model used to determine an anomaly temperature based on a rareness value. For example, the temperature may be a real-numbered value between 0 (the lowest temperature) and 1 (the highest temperature). In general, sequence cluster pairs associated with higher temperature values may be reported more often, and vice versa.

As shown, the anomaly model 350 is based on counts of rareness values. That is, each histogram bar 355 depicts a number of times that events having a given rareness value have previously been observed. In one embodiment, the detection module may use such a count as the anomaly temperature.

In one embodiment, the anomaly model 350 may include decay logic which gives greater weight to more recently observed events, and vice versa. In a further embodiment, the anomaly model 350 may be specific to an interaction type. For example, the anomaly model 350 may be based on counts of rareness values for a particular interaction such as collision, tailgating, jail-breaking, etc. as opposed to a count of rareness values for all (or a plurality of) observed interaction types.

Figure 4:
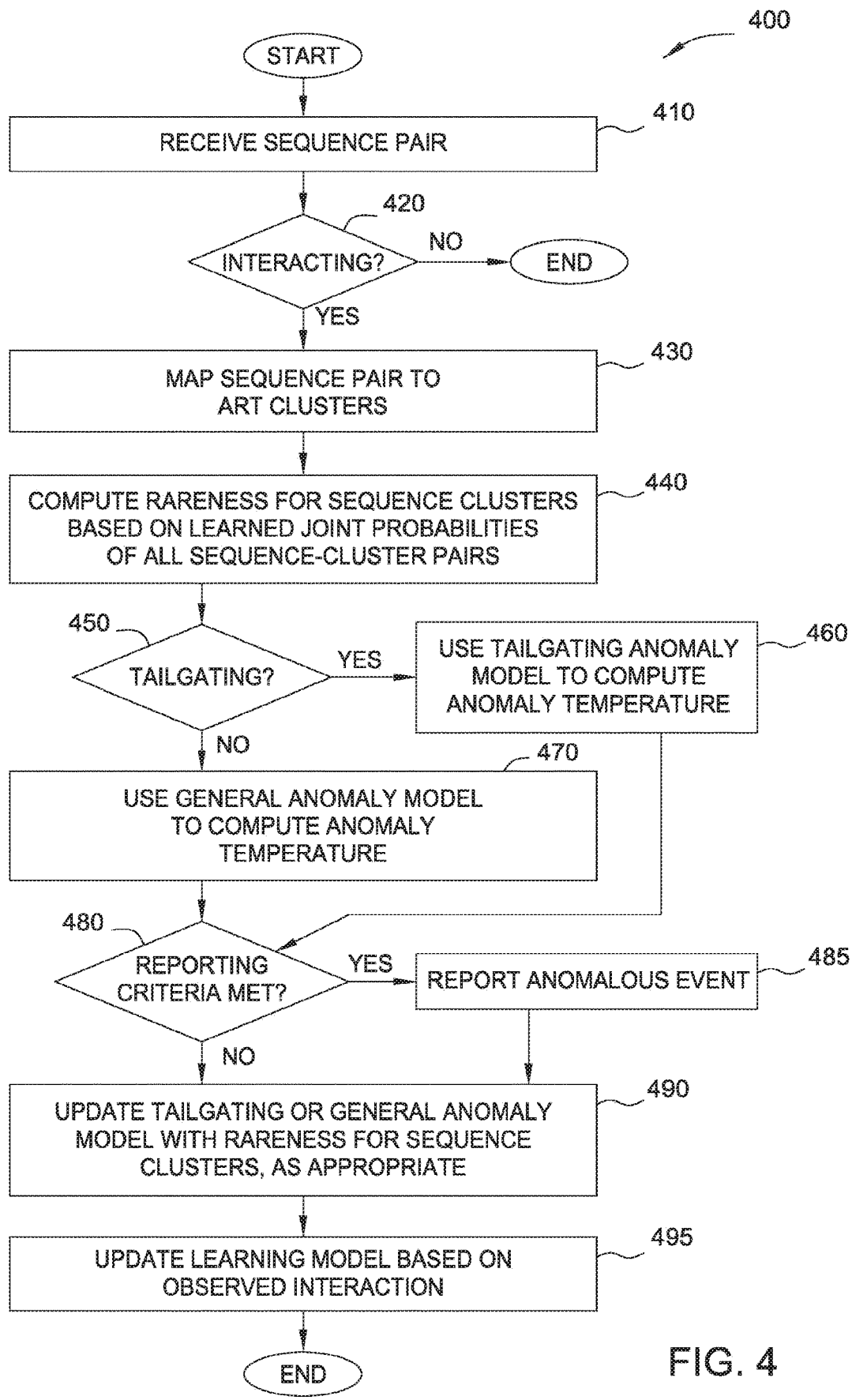
FIG. 4 illustrates a method 400 for detecting and reporting anomalous object interactions, according to one embodiment.

FIG. 4 illustrates a method 400 for detecting and reporting anomalous object interactions, according to one embodiment. As shown, the method 400 begins at step 410, where a detection module receives a sequence pair for processing. As discussed, sequences of the sequence pair may be generated from object trajectory data by a voting experts component which attempts to maximize entropy between segments and to minimize internal entropy within each segment.

In one embodiment, each sequence may include data points having components (x, y, t) which represent the position of the object (x, y) at a given time t. In one embodiment, each sequence (or each sequence of an interacting sequence pair, as determined at step 420) may be normalized to an n-dimensional vector, and individual components x, y, and t are normalized to have values in the range [0, 1]. For example, if n=15, then any length sequence may be normalized to a vector $(x_1, y_1, t_1, x_2, y_2, t_2, \ldots x_5, y_5, t_5)$ using interpolation techniques. Further, the pixel location values x and y may be normalized to the range [0,1] by dividing by the pixel width and height of the video frame, and the time value t may be normalized to the range [0,1] based on a statistical distribution of previous sequence time durations, with normalized value 1 corresponding to 99th percentile of all such durations arranged in increasing order in a histogram. The resulting n-dimensional vector may then be compared to other normalized sequences by an ART network which clusters similar sequences, as discussed in greater detail below.

At step 420, the detection module determines whether an interaction between objects has occurred. The detection module may be configured to determine that an interaction has occurred based on spatio-temporal proximity between two objects. In general, the detection module may determine that an interaction has occurred if two objects are in close spatio-temporal proximity. For example, the detection module may conclude that an interaction has occurred if the edge of a bounding box of one object has come within 5 pixels of the edge of a bounding box of another object within a 5 second time interval. Alternatively, the detection module may conclude that an interaction has occurred if the trajectories (or sequences) of the objects intersect during a given time interval. If no interaction has occurred, the method 400 ends thereafter.

If the detection module determines that an interaction has occurred, then at step 430, the detection module determines a mapping of the sequence pairs to ART sequence clusters. As discussed, each sequence cluster may represent a type of sequence which was previously observed, and each of the sequences in the sequence pair may map to one such type of sequence to which the sequence is most similar, or to no previously observed type of sequence. In one embodiment, each ART sequence cluster is an n-dimensional vector $(x_1, y_1, t_1, x_2, y_2, \ldots x_n, y_n, t_n)$ with normalized x, y, and t values. In such a case, the sequence may be mapped to an ART sequence cluster based on spatial and temporal similarity between the sequence and the sequence cluster. Alternatively, if a sequence does not map to any of the current ART sequence clusters, a new ART sequence cluster—with the unmapped sequence being the mean vector of the new cluster—may be created.

At step 440, the detection module computes a rareness value for the sequence clusters based on learned joint probabilities of all sequence-cluster pairs. In general, the rareness value may indicate how rare a given event is, as compared to other observed events. In one embodiment, the rareness value $R_{ij}$ for sequence cluster pair $\{C_i, C_j\}$, where $1 \leq i,j \leq K$ and K is the number of learned clusters, may be given by:

$$R_{ij} = 1 - \frac{f_{ij}}{f_{max}}, \qquad (1)$$

where $f_{ij}$ is a frequency with which the sequence cluster pair $\{C_i, C_j\}$ has been observed and $f_{max}$ is a frequency of the most frequently observed sequence cluster pair. Equation (1) produces rareness value $R_{ij}=0$ for the most frequently observed sequence cluster pair and rareness value $R_{ij}=1$ for the least frequently observed sequence cluster pair. As will be clear to persons of ordinary skill, other rareness formulations may be used. For example, the frequency of the most frequently observed sequence cluster pair $f_{max}$ in equation (1) may be replaced by a count of all observed sequence cluster pairs.

In one embodiment, the frequency $f_{ij}$ may be retrieved from an ngram trie which stores joint probabilities for observed sequence cluster pairs $\{C_i, C_j\}$. For example, the ngram trie may include two layers, the nodes of which correspond to the sequence clusters of observed sequence cluster pairs. The ngram trie may be incrementally updated to include additional node pairs representing new sequence cluster pairs when those pairs are observed in the scene. Further, the joint probabilities stored in the nodes of the ngram trie may be updated based on observed sequence cluster pairs (e.g., a frequency count may be incremented every time sequences which map to the sequence cluster pair are observed).

At step 450, the detection module determines whether the sequence clusters meet the definition of a tailgating event. As used herein, tailgating refers to an interaction in which one object closely follows another (e.g., one vehicle sneaking through a security gate after another vehicle). In one embodiment, tailgating may be defined as interacting object sequences mapping to the same sequence cluster. In such a case, the detection module may simply determine whether the sequence cluster mappings determined at step 430 are the same. In another embodiment, two sequences exhibiting tailgating may have different spatio-temporal properties and thus map to two difference sequence clusters. In such a case, tailgating may be defined as interacting object sequences mapping to the same cluster or to different clusters, but having spatial temporal properties particular to tailgating which may be determined using heuristics (e.g., the starting and ending points of the sequences being similar, the sequences following each other in time, etc.).

Although discussed above with respect to tailgating, various types of object interactions may be observed, including, but not limited to, jail-breaking (e.g., a user sneaking out of a security gate after another user, characterized by both objects co-existing in the scene, one after another behind the gate), collision/scattering (e.g., a vehicle changing its path after crashing into another vehicle, characterized by two objects interacting with each other and changing their paths in unexpected ways; a vehicle colliding with a pedestrian or stationary object), extended interactions (e.g., two people moving close together and chatting, characterized by objects moving into close spatio-temporal proximity and interacting for an unusually long time), anomalous temporal interactions (i.e., two objects moving with unusual temporal properties in a given spatial neighborhood), anomalous special interactions (two objects moving in an unusual spatial neighborhood and/or through unusual directions), and anomalous spatio-temporal interactions. Similar to the definition of tailgating as, e.g., two sequences mapping to the same sequence cluster, the foregoing object interaction types may be defined based on the types of sequence clusters which appear in sequence cluster pairs associated with each object interaction type. The foregoing object interaction types may also be defined based on spatio-temporal properties of sequence pairs particular to the interaction types, which may be determined using heuristics.

If the detection module determines that the sequence cluster pair meets the definition of tailgating, then at step 460 the detection module uses a tailgating statistical anomaly model to compute an anomaly temperature for the sequence clusters. As discussed, the anomaly temperature may be a real-numbered value between 0 (the lowest temperature) and 1 (the highest temperature), and sequence cluster pairs associated with higher temperature values may generally be reported (e.g., to a user) more often, and vice versa.

In one embodiment, the statistical anomaly model may be based on counts of rareness values. In particular, the tailgating anomaly model may keep track of the number of times a given rareness value has previously been observed for tailgating interactions, and the detection module may use the count as the anomaly temperature. In such a case, the detection module is able to differentiate how anomalous or unusual a given rareness value is for the tailgating interaction, because more anomalous rareness values will have lower counts/anomaly temperatures.

In an alternative embodiment, the anomaly model may use a value other than the count of previous instances of the rareness value as the anomaly temperature. For example, the anomaly model may use a smooth distribution (e.g., a distribution generated based on a function fitting of rareness vs. count) to determine an anomaly temperature value.

If the detection module determines that the sequence cluster pair does not meet the definition of tailgating, then at step 460 the detection module uses a general statistical anomaly model to compute an anomaly temperature for the sequence clusters. The general anomaly model may be similar to the tailgating anomaly model discussed above, except the general anomaly model may include rareness data for interactions other than tailgating.

As discussed, tailgating is only one of many possible interactions. In alternative embodiments, an anomaly model may be created for one or more other interaction types, and a general anomaly model may be used for one or more of the remaining interaction types.

At step 480, the detection module determines whether a criterion or criteria for reporting are met. For example, a criterion for reporting could be that the anomaly temperature exceeds a threshold value. If the detection module determines at step 480 that the reporting criterion or criteria are met, the method 400 continues at step 485, where the detection module reports the object interaction as an anomalous object interaction. The detection module may, for example, issue an alert to a user interface, thereby notifying the user of the object interaction.

In one embodiment, alerts may be assigned a measure of severity (e.g., a value ranging from 1 to 100) and sorted into levels based on the measure (e.g., a high severity for alerts with a measure from 80 to 100). In some cases, the detection module and the machine learning engine may generate a large volume of alerts. One approach for limiting the number of alerts presented to a user is simply to provide a cutoff for the alerts of a given type, or a cutoff for the severity of alerts published by the machine learning engine. However, doing so does not account for the differences between different alert types or for the relative frequency of different alert types.

Accordingly, one embodiment provides a framework for normalizing the number of alerts generated for multiple disjoint alert types in a behavioral recognition system. In particular, a user may provide a desired alert-publication rate along with the relative weights of different alert types. For example, a user may wish to see the top 100 alerts, distributed equally across alert types. In such a case, an alert normalization module may evaluate a distribution of previously published alerts (e.g., over the last N number of day) for each alert type to identify a distribution of alerts of each type. Once the distribution is determined, a severity expected to result in the correct number of alerts for that type may be determined. Assume, e.g., that a user specifies a desired publication rate of 100 total alerts for four different alert types. In such a case, the normalization module identifies a measure of alert severity for each alert type expected to result in twenty-five alerts of each type. This approach ensures that the number of alerts generated for each type should generally conform to the desired number of alerts, as well as be limited to the most severe alerts of any given type.

More specifically, the normalization module (1) brings statistical consistency across a rareness value from different alert types and (2) ensures an average number of alerts that would be published from the behavioral recognition system irrespective of the number of alert types in the system. In addition to relying on previously observed alert counts to generate the alert normalization values—and set alert rareness values based on the normalized alert values, the normalization module may also respond dynamically to increases in alert volume. Returning to an example where a user has requested to limit the overall alert volume to the top 100 alerts each day, distributed equally across four alert types, assume that changes in expected behavior in the scene result in 25 alerts of a first alert type being generated early in the day. In such a case, the alert normalization module could begin increasing the rareness value required for an alert of the first type to be published.

In addition to an alert, data related to the alert may be published to a user. The user may then, e.g., create a directive based on the data so that when a similar observation is later observed, another alert is published. In one embodiment, the data related to the alert may include raw trajectory samples ($\{x, y, t\}$) for the interacting objects (e.g., a trajectory sample for a tailgating object and a second trajectory sample for an object being tailgated), as well as interaction properties (xInt, yInt, tInt), where xInt and yInt indicate x and y positions of the interaction and tInt indicates a time difference of the object's trajectories at the spatial intersection of the trajectories. In such a case, the directive may be configured to publish another alert if a later interacting sequence pair occurs within a given spatial neighborhood (dx, dy) of (xInt, yInt) and temporal neighborhood dt of tInt.

After steps 480 and 485, the method 400 continues at step 490, where the detection module updates the tailgating or general anomaly model with the rareness value determined at step 440, as appropriate. As discussed, each anomaly model may be based on counts of rareness values. In such a case, the detection module may simply increment the count associated with the rareness value determined at step 440.

At step 495, the detection module updates the learning model which is used to determine rareness of sequence cluster pairs, as discussed above. In one embodiment, ART sequence clusters may be created with any new sequence in the sequence pairs with the unmapped sequence being the mean vector of the new cluster. Alternatively, if the sequence maps to any known ART sequence cluster, a mean vector and a frequency of that sequence cluster may be updated. In another embodiment, an ngram trie which stores learned joint probabilities may be updated to include additional nodes if the current sequence cluster pair is not already represented by nodes in the ngram trie. Alternatively, if the current sequence cluster pair is represented by nodes in the ngram trie, the joint probability stored may be updated (e.g., by incrementing a frequency count).

Although discussed above with respect to classifying interactions based on type, techniques similar to those discussed herein may be used to identify object-type specific anomalous interactions. That is, different object-type interactions (e.g., vehicle-vehicle interactions as opposed to human-human interactions) may be treated differently. Further, as discussed, the machine learning engine may learn those object types without any types being defined in advance.

Although discussed above with respect to sequence cluster pairs, sequences of sequence clusters may also be used, and such sequences may themselves be clustered, etc.

While the foregoing is directed to embodiments of the present invention, other and further embodiments of the invention may be devised without departing from the basic scope thereof, and the scope thereof is determined by the claims that follow.

What is claimed is:

1. A processor-implemented method, comprising:
receiving, at a processor, a first sequence and a second sequence, the first sequence associated with a segment of a trajectory of a first object through a scene, and the second sequence associated with a segment of a trajectory of a second object through the scene;
upon determining, via the processor, that the first object and the second object interact with one another, mapping the first sequence to a first sequence cluster and mapping the second sequence to a second sequence cluster;
determining, via the processor, a rareness value for the first sequence cluster and the second sequence cluster, the rareness value given by:

$R_{ij}=1-f_{ij}/f_{max}$, where $f_{ij}$ is an observation frequency associated with the first sequence cluster and the second sequence cluster, and $f_{max}$ is a frequency of a most frequently observed sequence cluster pair;
determining an anomaly temperature based on the rareness value; and
issuing an anomalous object interaction report when the anomaly temperature has a value that exceeds a threshold value.

2. The processor-implemented method of claim 1, wherein each of the first sequence and the second sequence is normalized to an n-dimensional vector.

3. The processor-implemented method of claim 1, wherein determining that the first object and the second object interact includes detecting that an edge of a bounding box of the first sequence has come within a predetermined number of pixels of an edge of a bounding box of the second sequence.

4. The processor-implemented method of claim 1, wherein determining that the first object and the second object interact includes detecting that the trajectory of the first object intersects with the trajectory of the second object.

5. The processor-implemented method of claim 1, further comprising detecting, based on the first sequence cluster and the second sequence cluster, a tailgating event, the determining the anomaly temperature further based on a tailgating anomaly model.

6. The processor-implemented method of claim 1, wherein determining the anomaly temperature is performed using a statistical anomaly model.

7. The processor-implemented method of claim 1, further comprising updating an anomaly model based on the rareness value.

8. An apparatus, comprising:
a processor; and
a memory in operable communication with the processor and storing processor-executable instructions to:
receive a first sequence and a second sequence, the first sequence associated with a segment of a trajectory of a first object through a scene, and the second sequence associated with a segment of a trajectory of a second object through the scene;
upon determining that the first object and the second object interact with one another, mapping the first sequence to a first sequence cluster and mapping the second sequence to a second sequence cluster;
determine a rareness value for the first sequence cluster and the second sequence cluster, the rareness value given by:

$R_{ij}=1-f_{ij}/f_{max}$, where $f_{ij}$ is an observation frequency associated with the first sequence cluster and the second sequence clusters, and $f_{max}$ is a frequency of a most frequently observed sequence cluster pair;
determine an anomaly temperature based on the rareness value; and
issue an anomalous object interaction report if a value of the anomaly temperature exceeds a threshold value.

9. The apparatus of claim 8, wherein each of the first sequence and the second sequence is normalized to an n-dimensional vector.

10. The apparatus of claim 8, wherein determining that the first object and the second object interact includes detecting that an edge of a bounding box of the first sequence has come within a predetermined number of pixels of an edge of a bounding box of the second sequence.

11. The apparatus of claim 8, wherein determining that the first object and the second object interact includes detecting that the trajectory of the first object intersects with the trajectory of the second object.

12. The apparatus of claim 8, the memory further storing processor-executable instructions to detect, based on the first sequence cluster and the second sequence cluster, a tailgating event, the determining the anomaly temperature further based on a tailgating anomaly model.

13. The apparatus of claim 8, wherein determining the anomaly temperature is performed using a statistical anomaly model.

14. The apparatus of claim 8, the memory further storing processor-executable instructions to update an anomaly model based on the rareness value.

15. A non-transitory processor-readable medium storing instructions to:
receiving a first sequence and a second sequence, the first sequence associated with a segment of a trajectory of a first object through a scene, and the second sequence associated with a segment of a trajectory of a second object through the scene;
upon determining that the first object and the second object interact with one another, mapping the first sequence to a first sequence cluster and mapping the second sequence to a second sequence cluster;
determine a rareness value for the first sequence cluster and the second sequence cluster, the rareness value given by:

$$R_{ij} = 1 - f_{ij}/f_{max},$$

where $f_{ij}$ is an observation frequency associated with the first sequence cluster and the second sequence cluster, and $f_{max}$ is a frequency of a most frequently observed sequence cluster pair;

determine an anomaly temperature based on the rareness value; and
issue an anomalous object interaction report if the anomaly temperature has a value that exceeds a threshold value.

16. The processor-readable medium of claim 15, wherein each of the first sequence and the second sequence is normalized to an n-dimensional vector.

17. The processor-readable medium of claim 15, wherein determining that the first object and the second object interact includes detecting that an edge of a bounding box of the first sequence has come within a predetermined number of pixels of an edge of a bounding box of the second sequence.

18. The processor-readable medium of claim 15, wherein determining that the first object and the second object interact includes detecting that the trajectory of the first object intersects with the trajectory of the second object.

19. The processor-readable medium of claim 15, further storing processor-executable instructions to detect, based on the first sequence cluster and the second sequence cluster, a tailgating event, the determining the anomaly temperature further based on a tailgating anomaly model.

20. The processor-readable medium of claim 15, wherein determining the anomaly temperature is performed using a statistical anomaly model.

* * * * *